United States Patent
Irukulapati et al.

(10) Patent No.: US 11,751,252 B2
(45) Date of Patent: Sep. 5, 2023

(54) SIGNALING MECHANISM FOR MESSAGE AND PHYSICAL UPLINK SHARED CHANNEL REPETITIONS

(71) Applicant: Telefonaktiebolaget LM Ericsson (publ), Stockholm (SE)

(72) Inventors: Naga Vishnu Kanth Irukulapati, Västra Frölunda (SE); Jingya Li, Gothenburg (SE); Jianwei Zhang, Solna (SE); Robert Baldemair, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 115 days.

(21) Appl. No.: 17/053,035

(22) PCT Filed: May 10, 2019

(86) PCT No.: PCT/SE2019/050416
§ 371 (c)(1),
(2) Date: Nov. 4, 2020

(87) PCT Pub. No.: WO2019/216818
PCT Pub. Date: Nov. 14, 2019

(65) Prior Publication Data
US 2021/0235503 A1    Jul. 29, 2021

Related U.S. Application Data

(60) Provisional application No. 62/669,722, filed on May 10, 2018.

(51) Int. Cl.
*H04W 74/08* (2009.01)
*H04L 1/08* (2006.01)

(52) U.S. Cl.
CPC .......... *H04W 74/0833* (2013.01); *H04L 1/08* (2013.01)

(58) Field of Classification Search
None
See application file for complete search history.

(56) References Cited

U.S. PATENT DOCUMENTS 10,743,350 B2 * 8/2020 Tirronen ........... H04W 72/0446
2015/0031410 A1 * 1/2015 Lim .................... H04W 52/146
455/522

(Continued)

FOREIGN PATENT DOCUMENTS

EP          3089542 A1    2/2016
WO       2015033195 A2    3/2015

(Continued)

OTHER PUBLICATIONS

U.S. Appl. No. 62/576,633, Hwang, Resource allocation method with dynamic information size (Year: 2017).*

(Continued)

*Primary Examiner* — The Hy Nguyen
(74) *Attorney, Agent, or Firm* — CHRISTOPHER & WEISBERG, P.A.

(57) ABSTRACT

A method, network node and wireless device, WD, providing signaling mechanisms for enabling repetitions of messages related to random access, RA, are disclosed. According to one aspect, a network node transmits an indication of a number of zero or more repetitions of a message related to RA to be transmitted by the WD in response to a random access response, RAR, message transmitted to the WD. The network node further receives at least one message related to RA.

16 Claims, 11 Drawing Sheets

(56) References Cited

U.S. PATENT DOCUMENTS

| | | | |
|---|---|---|---|
| 2015/0181595 A1* | 6/2015 | Li | H04W 56/00 |
| | | | 370/336 |
| 2016/0165640 A1* | 6/2016 | Yang | H04L 5/0053 |
| | | | 370/336 |
| 2017/0141833 A1 | 5/2017 | Kim et al. | |
| 2017/0273113 A1* | 9/2017 | Tirronen | H04W 72/0446 |
| 2017/0280481 A1 | 9/2017 | Stern-Berkowitz et al. | |
| 2017/0373715 A1* | 12/2017 | Moroga | H04L 1/04 |
| 2018/0263064 A1* | 9/2018 | Islam | H04L 27/2602 |
| 2020/0059332 A1* | 2/2020 | Takeda | H04L 5/0012 |
| 2020/0120642 A1* | 4/2020 | Hwang | H04L 5/0048 |
| 2020/0235881 A1* | 7/2020 | Choi | H04B 7/0695 |
| 2020/0367290 A1* | 11/2020 | Mazloum | H04W 74/0833 |
| 2020/0389204 A1* | 12/2020 | Matsumura | H04W 72/0453 |

FOREIGN PATENT DOCUMENTS

| | | |
|---|---|---|
| WO | 2015033195 A3 | 3/2015 |
| WO | WO-2019155637 A1 * | 8/2019 |
| WO | WO-2019159294 A1 * | 8/2019 |
| WO | 2019170390 A1 | 9/2019 |

OTHER PUBLICATIONS

U.S. Appl. No. 62/571,167, Choi, Apparatus and method of frequency hopping for SRS resource in NR (Year: 2017).*

EPO Communication and European Search Report dated Dec. 22, 2021 for European Application No. 19800506.8, consisting of 12-pages.

3GPP TSG RAN WG1 Meeting #92 R1-1801301; Title: Final Report of 3GPP TSG RAN WG1 #91 v1.0.0 (reno, USA, Nov. 27-Dec. 1, 2017); Source: MCC Support; Document for: Approval; Date and Location: Feb. 26-Mar. 2, 2018, Athens, Greece, consisting of 218-pages.

3GPP TSG RAN WG1 Meeting #92 R1-1801924; Title: Early data transmission for eMTC; Agenda Item: 6.2.5.2 Source: Samsung; Document for: Discussion/Decision; Date and Location: Feb. 26-Mar. 2, 2018, Athens, Greece, consisting of 6-pages.

International Search Report and Written Opinion dated Jun. 28, 2019 for International Application No. PCT/EP2019/050416 filed on May 10, 2019, consisting of 12-pages.

Taiwan Office Action, Search Report and English Translation dated Apr. 6, 2020 issued for Application No. 108116304 consisting of 17-pages.

3GPP TSG-RAN WG2 #102 R2-1807028; Title: Solutions to Coverage Issues for Msg3 Transmissions; Source Ericsson; Agenda Item: 10.3.1.4.3; Document for: Discussion and Decision; Date and Location: May 21-25, 2018, Busan, Republic of Korea, consisting of 4-pages.

3GPP TSG-RAN WG2 101 bis R2-1806508; Title: Reply LS on MSG3 size for NR; Source: RAN2; Work Item: NR_newRAT-Core; Release: Rel-15; Date and Location: Apr. 16-20, 2018, Sanya, China, consisting of 1-page.

3GPP TSG-RAN WG2 Meeting #101 Tdoc R2-1804073; Title: LS on Message 3 size for NR; Source; RAN2; Work Item: NR_newRAT-Core; Date and Location: Feb. 26-Mar. 2, 2018, Athens, Greece, consisting of 1-page.

3GPP TSG RAN WG1 Meeting #93 R1-1805814; Title: Reply LS on MSG3 size for NR; Source: RAN2; Work Item: NR newRAT-Core; Date and Location: May 21-25, 2018, Busan, Korea, consisting of 1-page.

3GPP TSG RAN WG1 Meeting #92bis R1-1805657; Title: Reply LS on Message 3 size for NR; Source: RAN WG1; Work Item: NR newRAT-Core; Date and Location: Apr. 16-20, 2018, Sanya, China, consisting of 2-pages.

3GPP TSG RAN WG1 Meeting #92bis R1-1805221; Title: Remaining details of RACH procedure; Source: Ericsson Agenda Item: 7.1.1.4.2; Document for: Discussion,Decision; Date and Location: Apr. 16-20, 2018, Sanya, China, consisting of 12-pages.

3GPP TSG RAN WG1 Meeting #92bis R1-1805224; Title: Om multiple preamble transmissions for contention free random access; Source: Ericsson; Agenda Item: 7.1.1.6; Document for: Discussion,Decision; Date and Location: Apr. 16-20, 2018, Sanya, China, consisting of 5-pages.

3GPP TSG-RAN1 Meeting #92bis R1-1805796; Title: CR to 38.214 capturing the RAN1#92bis meeting agreements; Source: Nokia; Date and Location: Apr. 16-20, 2018, Sanya, P.R. China, consisting of 87-pages.

3GPP TS 38.331 V15.1.0; 3rd Generation Partnership Project:Technical Specification Group Radio Access Network: NR; Radio Resource Control (RRC) protocol specification (Release 15); Mar. 2018, consisting of 268-pages.

3GPP TS 38.321 V15.1.0; 3rd Generation Partnership Project:Technical Specification Group Radio Access Network: NR; Medium Access Control (MAC) protocol specification (Release 15); Mar. 2018, consisting of 67-pages.

3GPP TS 38.214 V15.1.0; 3rd Generation Partnership Project:Technical Specification Group Radio Access Network: NR; Physical layer procedures for data (Release 15); Mar. 2018, consisting of 77-pages.

3GPP TS 36.331 V15.1.0; 3rd Generation Partnership Project:Technical Specification Group Radio Access Network: Evolved Universal Terrestrial Radio Access (E-UTRA); Radio Resource Control (RRC) Protocol specification (Release 15); Mar. 2018, consisting of 438-pages.

3GPP Ts 38.213 V15.1.0; 3rd Generation Partnership Project:Technical Specification Group Radio Access Network: NR; Physical layer procedures for control (Release 15); Mar. 2018, consisting of 77-pages.

3GPP Ts 36.213 V15.1.0; 3rd Generation Partnership Project:Technical Specification Group Radio Access Network: Evolved Universal Terrestrial Radio Access (E-UTRA); Physical layer procedures (Release 15); Mar. 2018, consisting of 499-pages.

* cited by examiner

| R | R | R | Timing Advance Command | | Oct 1 |
| Timing Advance Command | | | | UL Grant | Oct 2 |
| UL Grant | | | | | Oct 3 |
| UL Grant | | | | | Oct 4 |
| UL Grant | | | | | Oct 5 |
| Temporary C-RNTI | | | | | Oct 6 |
| Temporary C-RNTI | | | | | Oct 7 |

FIG. 2

SIGNALING MECHANISM FOR MESSAGE AND PHYSICAL UPLINK SHARED CHANNEL REPETITIONS

CROSS-REFERENCE TO RELATED APPLICATIONS

This application is a Submission Under 35 U.S.C. § 371 for U.S. National Stage Patent Application of International Application No.: PCT/SE2019/050416, filed May 10, 2019 entitled "SIGNALING MECHANISM FOR MESSAGE AND PHYSICAL UPLINK SHARED CHANNEL REPETITIONS," which claims priority to U. S. Provisional Application No.: 62/669,722, filed May 10, 2018, entitled "SIGNALING MECHANISM FOR MESSAGE AND PHYSICAL UPLINK SHARED CHANNEL REPETITIONS," the entireties of both of which are incorporated herein by reference.

TECHNICAL FIELD

The present disclosure relates to wireless communications, and in particular, to signaling mechanisms for messages such as Msg3 messages and physical uplink shared channel (PUSCH) repetitions.

BACKGROUND

A random access (RA) procedure is a function in a cellular wireless communication system. In Long Term Evolution (LTE), a wireless device (WD) that would like to access the network initiates the random access procedure by transmitting a preamble (Msg1) in the uplink on the Physical Random Access Channel (PRACH). A base station (eNB) receiving the preamble and detecting the random access attempt will respond in the downlink (DL) by transmitting a random access response (RAR, Msg2). The downlink is from the base station to the WD. The RAR carries an uplink scheduling grant for the WD to continue the procedure by transmitting a following subsequent message in the uplink (Msg3) for terminal identification. The uplink is from the WD to the base station. A similar procedure is envisioned for New Radio (NR) (also referred to as fifth generation (5G)) which may include a next generation Node B, gNB, or transmission and reception point (TRP), i.e., a base station or access node.

Referring to FIG. 1, before transmission of the PRACH preamble, the WD receives both a set of synchronization signals and configuration parameters on a broadcast channel in a synchronization signal (SS)-block (e.g., New Radio primary synchronization signal (NR-PSS), New Radio secondary synchronization signal (NR-SSS), New Radio physical broadcast channel (NR-PBCH)), possibly complemented with configuration parameters received on yet another channel.

Msg3 is transmitted by using a PUSCH channel. Besides Msg3 payload, demodulation reference signals (DMRS) are also transmitted to assist the data decoding at the base station (eNB or gNB). In both LTE and NR, for 4-step random access procedures, the initial transmission of Msg3 is scheduled by the uplink (UL) grant contained in an RAR. The retransmission of Msg3 is scheduled by UL grant over the physical downlink control channel (PDCCH). In LTE, Msg3 repetitions can be configured by the UL grant contained in RAR for coverage enhancements for bandwidth reduced low complexity/coverage enhancement (BL/CE) WDs.

In LTE, the uplink grant field in the RAR, also referred to as the random access response grant field, indicates the resources to be used on the uplink. The size of the UL grant field is 20 bits for Non-BL/CE WDs. The content of these 20 bits starting with the most significant bit (MSB) and ending with the least significant bit (LSB) may be as follows:
Hopping flag—1 bit;
Fixed size resource block assignment—10 bits; and
Truncated modulation and coding scheme—4 bits.
If a WD is configured with a higher layer parameter pusch-EnhancementsConfig, then:
Repetition number of Msg3—3 bits;
else
Transmission Power Control (TPC) command for scheduled PUSCH—3 bits;
UL delay—1 bit; and
Channel State Information (CSI) request—1 bit.

For narrow band Internet of things (NB-IoT) WDs, the size of the UL grant field is 15 bits, and for BL WDs and WDs in enhanced coverage level 2 or 3, the size of the UL grant field is 12 bits. The contents of the UL grant are listed in Table 6-2 of the Third Generation Partnership Project (3GPP) Technical Standard (TS) 36.213 v. 15.1.0 for BL/CE WD.

In NR, the UL grant (or RAR grant) is increased to 25 bits which are allocated as set forth in the following table from the 3GPP Technical Standard (TS) 38.213 v. 15.1.0, Table 8.2-1:

| RAR grant field | Number of bits |
| --- | --- |
| Frequency hopping flag | 1 |
| Msg3 PUSCH frequency resource allocation | 12 |
| Msg3 PUSCH time resource allocation | 4 |
| MCS | 4 |
| TPC command for Msg3 PUSCH | 3 |
| CSI request | 1 |

Besides the 25 bits, the RAR payload includes a timing advance (TA) command, temporary cell-radio network temporary identifier (TC-RNTI), and 3 reserved bits making the RAR payload 7 bytes long as shown in FIG. 2.

A size of Msg3 depends on whether the Msg3 is a radio resource control (RRC) ConnectionRequest or an RRCConnectionResumeRequest. A minimum grant of Msg3 is 7 bytes in LTE that can be used for RRCConnectionRequest or using truncatedID for RRCConnectionResumeRequest. If full resumeID is used, then the Msg3 size is at least 9 bytes in LTE.

From 3GPP TS 36.331 v. 15.1 0 ASN.1: These messages are delivered to layer 3 (L3) (RRC) as an UL-common control channel (CCCH)-Message, where the network has to distinguish the RRCConnectionReestablishmentRequest, the RRCConnectionRequest, and the RRCConnectionResumeRequest-r13 messages.

The following can be concluded:
RRCConnectionRequest: 56 bits;
a) UL-CCCH message part: 2 bits;
b) criticalExtensions: 1 bit;
c) InitialUE-indentity: 41 bits (1 bit to distinguish between a system architecture evolution (SAE) temporary mobile subscriber identity (S-TMSI) and a random value, either of which is 40 bits);
d) Establishment cause: 3 bits;
e) Spare: 1 bit; and f) medium access control (MAC) subheader: 1 byte.
RRCConnectionResumeRequest: 72 bits
g) UL-CCCH message part: 2 bits;
h) criticalExtensions: 1 bit;
i) ResumeIdentity-r13 (1+40 bit) and a truncated resume ID (1+24 bit);
j) shortResumeMacI: 16 bits;
k) Resume cause: 3 bits;
l) Spare: 1 bit; and
m) MAC subheader: 1 byte.

For NR, discussions have occurred regarding the size of Msg3. For example, discussions were had as to the possible transport block size of the common control channel (CCCH) service data unit (SDU)+medium access control (MAC) header (2 octets) delivered as message 3 for NR. Based on these discussions, it was determined that from a Layer 1 specification perspective, Msg3 can be scheduled with corresponding payload sizes from 3 to hundreds of bytes according to the transport block size (TBS) calculation from section 5.1.3 of 3GPP (TS) 38.214 v. 15.1.0, and that a Msg3 TBS larger than 56 bits for NR has the risk of reducing the coverage of Msg3 PUSCH compared to LTE Msg3 PUSCH. Discussions were had as to whether, similar to LTE, NR can support:

RRC Connection Request: 56 bits; and
RRC Connection Resume Request: 72 bits.

Since Msg3 is an UL message, it can use either Discrete Fourier Transform spread orthogonal frequency division multiplex (DFTS-OFDM) or OFDM as a transmit waveform. When it comes to frequency allocation, there is Type 1 (continuous allocation) or Type 0 (bitmap/non-contiguous allocation) frequency resource allocation.

When the WD is configured with aggregationFactorUL>1, the same symbol allocation is applied across the aggregationFactorUL consecutive slots and the PUSCH is limited to a single transmission layer. The WD should repeat the transport block (TB) across the aggregationFactorUL consecutive slots applying the same symbol allocation in each slot.

If the WD procedure for determining slot configuration, as defined in 3GPP TS 38.213 v. 15.1.0, determines symbols of a slot allocated for PUSCH as downlink symbols, the transmission on that slot is omitted for multi-slot PUSCH transmission.

In NR, repetition is only supported for normal PUSCH transmission but not Msg3 transmission. The repetition behavior defined for normal PUSCH will not be able to reach the intended repetitions unless at least a same number of consecutive uplink slots have been configured and are available.

Also, with repetitions, interpretation of a hopping flag in the UL grant will be unclear. A transmit power control (TPC) command which is defined for a no-repetitions use case of Msg3 is also not optimized for Msg3 repetitions.

SUMMARY

Some embodiments advantageously provide methods, network nodes and wireless devices configured with signaling mechanisms for Msg3 and physical uplink shared channel (PUSCH) repetitions. The Msg3 may be referred to more generally as an RAR resolution message, which resolution message is encompassed by the term "message related to random access (RA)". When aggregation is used for Msg3, a frequency hopping (FH) flag of the UL grant in the RAR can be interpreted in more than 1 way. One way of removing this ambiguity is by using the FH flag in a different way.

The aggregation behavior of PUSCH/Msg3 may be configurable depending on a network requirement and signaled via higher layers. Other configurations may be implicitly decided upon. One exemplary configuration of DL/UL slots in a time division duplex (TDD) network with latency requirements for different services is provided.

In some embodiments, a modification of the use of the TPC command based on the aggregation/repetition factor used for Msg3 is set forth herein. Also set forth herein is a mechanism for early stop of the Msg3 repetitions if a criterion is met, which will reduce consumption of resources.

Also, in some embodiments, it may be beneficial to have a minimum Msg3 size of 72 bits to reach similar coverage as 56 bits. Through some initial simulations, 72 bits with 1 repetition/hybrid automatic repeat request (HARQ) retransmission can actually give at least as good coverage as for 56 bits without repetition/HARQ retransmission. Of course, this may impact latency.

According to one aspect a network node configured to communicate with a wireless device, WD 22, is provided. The network node 16 includes a transceiver (radio interface) configured to transmit the indication of the number of zero or more repetitions of the message related to RA to be transmitted by the WD in response to an RAR message transmitted to the WD. The transceiver is also configured to receive at least one message related to RA and zero or more repetitions of the message related to RA. The message related to RA may be transmitted to the network node on the PUSCH.

According to this aspect, in some embodiments, the processing circuitry 68 is further configured to determine a number of bits of a transmission power control, TPC, field based at least in part on the indicated number of zero or more repetitions of the message related to RA. In some embodiments, the indicated number of zero or more repetitions is indicated by an aggregation factor. In some embodiments, the indicated number of zero or more repetitions is indicated at least in part by a length of the message related to RA. In some embodiments, the indicated number of zero or more repetitions is indicated at least in part by a payload of the message related to RA. In some embodiments, the transceiver is further configured to transmit an early-stop signal to stop a number of repetitions by the WD of the message related to RA prior to receipt of the indicated number of repetitions of the message related to RA. In some embodiments, the transceiver is further configured to transmit a frequency hop, FH, field to indicate whether the message related to RA is transmitted using inter-slot frequency hopping, intra-slot frequency hopping or no frequency hopping. In some embodiments, the FH field is interpreted based at least in part on an aggregation factor that indicates the number of zero or more repetitions of the message related to RA.

According to another aspect, a method implemented by a network node configured to communicate with a wireless device, WD, is provided. The method includes transmitting to the WD an indication of a number of zero or more repetitions of a message related to RA to be transmitted by the WD in response to an RAR message. The method also includes receiving at least one message related to RA and zero or more repetitions of the message related to RA.

According to this aspect, in some embodiments, the method further includes determining a number of bits of a transmission power control, TPC, field based at least in part on the indicated number of zero or more repetitions of the message related to RA. In some embodiments, the indicated number of zero or more repetitions is indicated by an aggregation factor. In some embodiments, the indicated number of zero or more repetitions is indicated at least in part by a length of the message related to RA. In some embodiments, the indicated number of zero or more repetitions is indicated at least in part by a payload of the message related to RA. In some embodiments, the method further includes transmitting an early-stop signal to stop a number of repetitions by the WD of the message related to RA prior to receipt of the indicated number of repetitions of the message related to RA. In some embodiments, the method further includes transmitting a frequency hop, FH, field to indicate whether the message related to RA is transmitted using inter-slot frequency hopping, intra-slot frequency hopping or no frequency hopping. In some embodiments, the FH field is interpreted based at least in part on an aggregation factor that indicates the number of zero or more repetitions of the message related to RA.

According to yet another aspect, a wireless device, WD, configured to communicate with a network node 16, is provided. The WD includes a transceiver (radio interface) configured to receive an indication of a number of zero or more repetitions of a message related to random access, RA, to be transmitted by the WD. The transceiver is further configured to transmit a first message related to RA and zero or more repetitions of the first message related to RA.

According to this aspect, in some embodiments, the indication of the number of zero or more repetitions is determined at least in part from a physical random access channel preamble. In some embodiments, one or more repetitions of the first message related to RA are transmitted using the same frequency and time allocation values as used to transmit the first message related to RA. In some embodiments, the WD further includes processing circuitry configured to cause the transceiver to transmit one or more repetitions of the first message related to RA across non-contiguous uplink slots. In some embodiments, the WD further includes processing circuitry configured to cause the transceiver to cease transmission of repetitions of the first message related to RA upon receipt from the network node of an early-stop signal.

According to another aspect, a method implemented in a wireless device, WD, configured to communicate with a network node, is provided. The method includes receiving an indication of a number of zero or more repetitions of a message related to random access, RA, to be transmitted by the WD. The method also includes transmitting a first message related to RA and zero or more repetitions of the first message related to RA.

According to this aspect, in some embodiments, the indication of the number of zero or more repetitions is determined at least in part from a physical random access channel preamble. In some embodiments, one or more repetitions of the first message related to RA are transmitted using the same frequency and time allocation values as used to transmit the first message related to RA. In some embodiments, the method includes transmitting one or more repetitions of the first message related to RA across non-contiguous uplink slots. In some embodiments, the method further includes ceasing transmission of repetitions of the first message related to RA upon receipt from the network node of an early-stop signal.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 2 is a diagram of an RAR payload;

DETAILED DESCRIPTION

Figure 1:
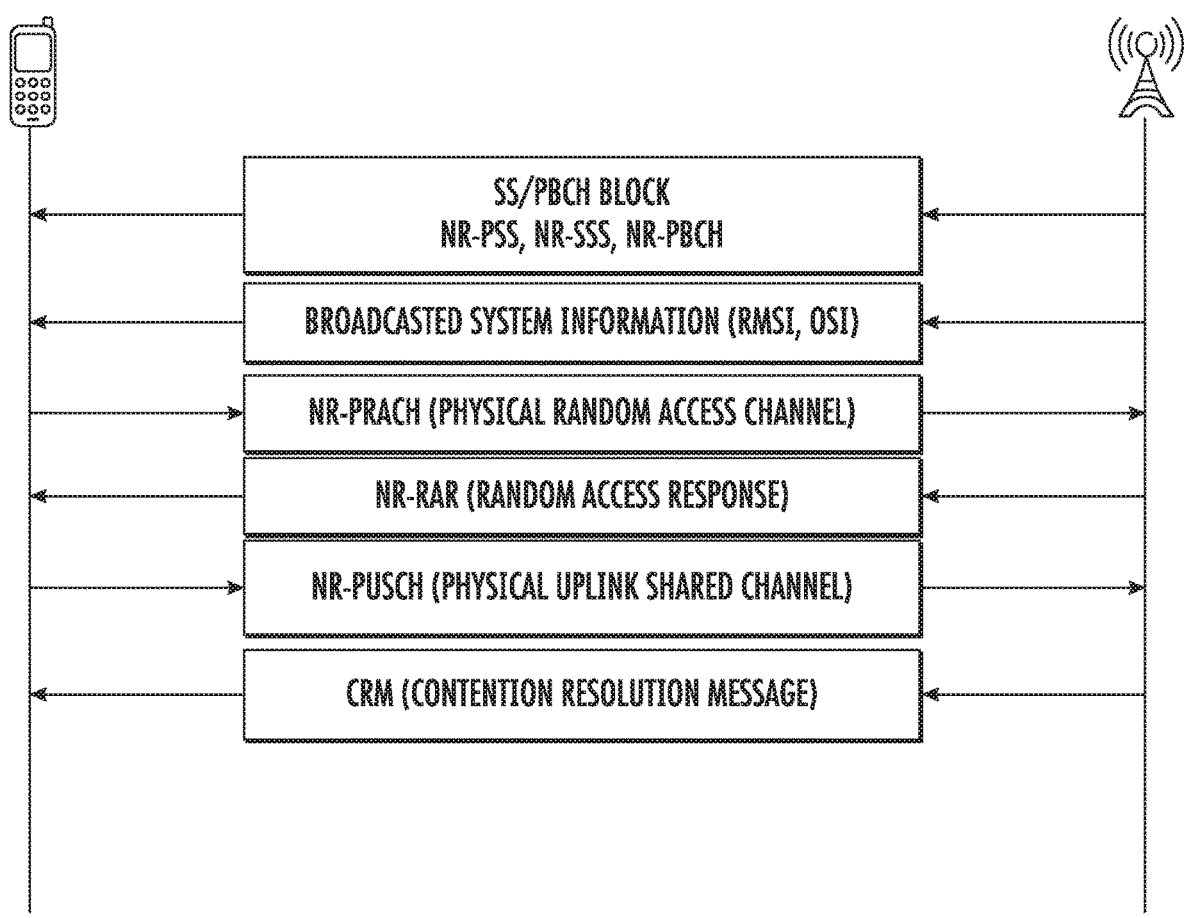
FIG. 1 is a diagram of exchange of messages between a network node and a WD.

Before describing in detail exemplary embodiments, it is noted that the embodiments reside primarily in combinations of apparatus components and processing steps related to signaling mechanisms for messages such as Msg3 and physical uplink shared channel (PUSCH) repetitions. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description. Also, although discussion is made herein with reference to Msg3 messages, the disclosure is not limited to such. It is contemplated that the functions, concepts and implementations described herein can be readily applied to other message types and formats, including those that may relate to standards other than LTE/NR.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, integrated access and backhaul (IAB) node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMAX), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

The term signal used herein can be any physical signal or physical channel. Examples of physical signals are reference signal such as PSS, SSS, CRS, PRS etc. The term physical channel (e.g., in the context of channel reception) used herein is also called as 'channel. Examples of physical channels are MIB, PBCH, NPBCH, PDCCH, PDSCH, sPUCCH, sPDSCH, sPUCCH, sPUSCH, MPDCCH, NPDCCH, NPDSCH, E-PDCCH, PUSCH, PUCCH, NPUSCH etc. These terms/abbreviations may be used according to 3GPP standard language, in particular according to LTE.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station, gNB or eNodeB. An uplink direction may refer to a data transfer direction from a terminal to a network node, e.g., eNB, gNB, base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station, gNB or eNodeB, may be adapted to provide and/or define and/or control one or more cells, e.g., a PCell and/or a LA cell.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD) may comprise configuring the WD to perform certain measurements on certain subframes or radio resources and reporting such measurements according to embodiments of the present disclosure.

Signaling may comprise one or more signals and/or symbols. Reference signaling may comprise one or more reference signals and/or symbols. Data signaling may pertain to signals and/or symbols containing data, in particular user data and/or payload data and/or data from a communication layer above the radio and/or physical layer/s. It may be considered that demodulation reference signaling comprises one or more demodulation signals and/or symbols. Demodulation reference signaling may in particular comprise DM-RS according to 3GPP, NR and/or LTE technologies. Demodulation reference signaling may generally be considered to represent signaling providing reference for a receiving device like a terminal to decode and/or demodulate associated data signaling or data. Demodulation reference signaling may be associated to data or data signaling, in particular to specific data or data signaling. It may be considered that data signaling and demodulation reference signaling are interlaced and/or multiplexed, e.g. arranged in the same time interval covering e.g. a subframe or slot or symbol, and/or in the same time-frequency resource structure like a resource block. A resource element may represent a smallest time-frequency resource, e.g. representing the time and frequency range covered by one symbol or a number of bits represented in a common modulation. A resource element may e.g. cover a symbol time length and a subcarrier, in particular in 3GPP, NR and/or LTE standards. A data transmission may represent and/or pertain to transmission of specific data, e.g. a specific block of data and/or transport block. Generally, demodulation reference signaling may comprise and/or represent a sequence of signals and/or symbols, which may identify and/or define the demodulation reference signaling.

Data or information may refer to any kind of data, in particular any one of and/or any combination of control data or user data or payload data. Control information (which may also be referred to as control data) may refer to data controlling and/or scheduling and/or pertaining to the process of data transmission and/or the network or terminal operation.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The minimum Msg 3 size in LTE is 7 bytes, and in NR a larger Msg3 size of 9 bytes is used. To reach the same coverage requirement for NR that is reached in LTE, repetition of Msg3 could be applied to meet the coverage requirement. Even without larger Msg3 size, Msg3 performance should be compatible with physical uplink shared channel (PUSCH) transmissions. In NR, repetition of the PUSCH may be configured to the WD once a radio resource control (RRC) parameter, pusch-AggregationFactor, is defined in an information element (IE), PUSCH-Config, that indicates the repetition of 2, 4, or 8. The PUSCH repetition behavior is described in 3GPP TS 38.214 v. 15.1.0. Msg3 should reach at least the same performance as PUSCH.

A decision for a Msg3 aggregation (repetition) factor can be addressed in different ways. One example is to tie the factor to WD channel quality and a data size the WD wants to transmit. Another example is deciding at the network node a repetition factor based on different reasons to trigger Msg3 repetitions on different WDs. One approach is to use the reserved bits in the random access response (RAR) grant to indicate Msg3 aggregation. The number of repetitions that maps to the bit field value could be either signaled via higher layer signaling or could be hard coded according to a predetermined specification. The repetition behavior, in the sense of where in time and frequency domain to transmit the repetitions, and with which redundancy version order, inter-slot or intra-slot frequency hopping when the frequency hop (FH) flag in the RAR grant is enabled, can follow the same manner as normal PUSCH aggregations. To avoid the ambiguity that might arise, a specification may clarify a component for Msg3 aggregation.

The frequency hopping flag is defined in Msg3 RAR to indicate if frequency hopping is enabled for that Msg3 transmission. In case of repetition, the behavior of Msg3 repetitions when FH is enabled may be defined. Intra-slot hopping may only be defined for discrete Fourier transform single carrier (DFTS)-OFDM.

Upon receiving the Msg3 repetitions, the network node may be able to decode the message earlier. Upon successfully decoding Msg3, the network node can send the Msg4 response earlier to the WD before all repetitions have been sent. The WD may stop any remaining repetitions at the receiving of Msg4, which can be assumed to be the same as detecting a physical downlink control channel (PDCCH) scrambled with a temporary cell radio network temporary identifier (TC-RNTI).

In one study by the 3GPP, the following observations have been made: "Msg.3 TB size larger than 56 bits for NR has a risk of reducing the coverage of Msg.3 PUSCH compared to LTE Msg.3 PUSCH." This is based on simulations. Also, the 3GPP has considered whether RAN1 can support 7 bytes and 9 bytes of Msg3 for RRCConnectionRequest and RRC-ConnectionResumeRequest, respectively.

Figure 3:
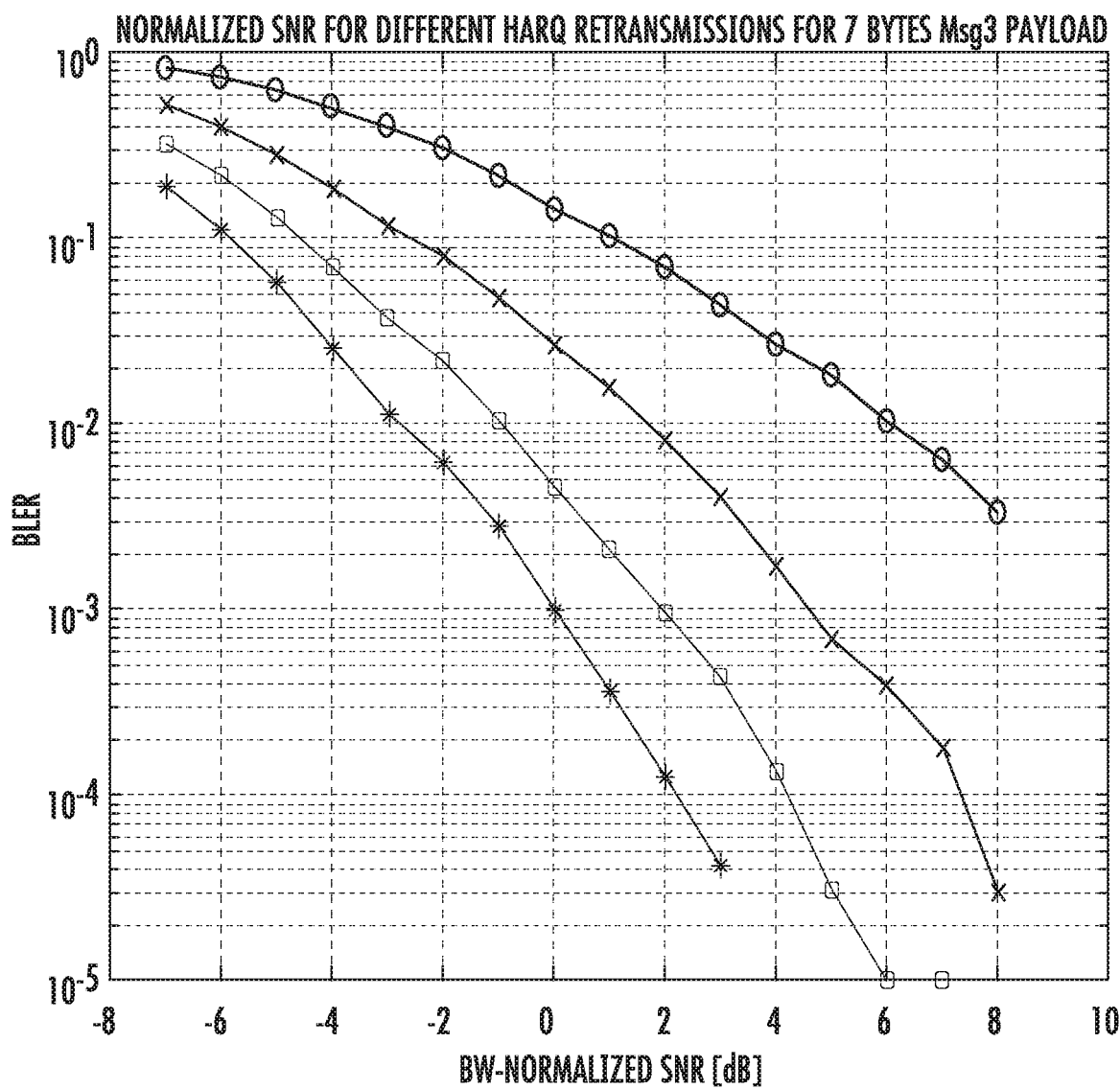
FIG. 3 is a graph of normalized signal to noise ratio for different hybrid automatic repeat request (HARD) re-transmissions.

It has been shown that by using hybrid automatic repeat request (HARQ) retransmissions or Msg.3 repetitions, improved coverage of Msg3 with 9 bytes can be achieved. Table 1 provides the normalized signal to noise ratio (SNR) at 10% block error rate (BLER) for different hybrid automatic repeat request (HARQ) retransmission values of 0 (no retransmission) to 3. It can be observed from Table 1 that with 1 retransmission of 9 bytes, better coverage than 7 bytes with no retransmission can be achieved. See FIG. 3 which plots BLER versus signal to noise ratio (SNR) and Table 1.

TABLE 1

| Normalized SNR (dB) @10% BLER for HARQ ReTx | 0 HARQ | 1 HARQ ReTx | 2 HARQ ReTx | 3 HARQ ReTx |
|---|---|---|---|---|
| 7 bytes (MCS0, 2 PRBs) | 1.10 | −2.49 | −4.48 | −5.75 |
| 9 bytes (MCS4, 1 PRB) | 2.30 | −1.94 | −4.01 | −5.27 |

Section 6.1.2 of 3GPP TS 38.214 v. 15.1.0, states that when the WD is configured with aggregationFactorUL>1, the same symbol allocation is applied across the aggregationFactorUL consecutive slots and the PUSCH is limited to a single transmission layer. The WD repeats the transport block (TB) across the aggregationFactorUL consecutive slots applying the same symbol allocation in each slot." In section 6.3.2 of 3GPP TS 38.331 v. 15.1.0, this aggregation factor is defined as 'pusch-AggregationFactor, and is ENUMERATED {n2, n4, n8}. It is also stated that pusch-AggregationFactor for Msg3 cannot be used, as this is signaled to the WD after initial access is done and through RRC signaling.

For NR, some embodiments provide that the aggregation factor is signaled in 2 of the 3 reserved bits in the RAR payload. Due to time constraints to finalize Rel-15, a similar structure as in normal PUSCH may be used for Msg3 repetitions, as shown in Table 2.

TABLE 2

| Parameter | Value |
|---|---|
| Channel Model | TDL-C |
| Numerology | 15 KHz |
| Carrier frequency | 2 GHz |
| Transmission Slot Length | 14 symbols |
| Transmission mode | FDD |
| Number of WD | 1 |
| UE speed | 15 km/h |
| Delay spread | 300 ns |
| Link Adaptation | Disabled |
| Antenna configuration | 2 receive antennas at eNB and 1 transmit antenna at WD |
| MIMO Layers | 1 |
| Channel estimator | DCT-based LMMSE |
| PRB bundled size | 4 PRBs |
| DMRS | 1 + 1 + 1 Type 1 configuration, and 11 symbols for data. Power boosting performed |
| Waveform | OFDM |

Figure 4:
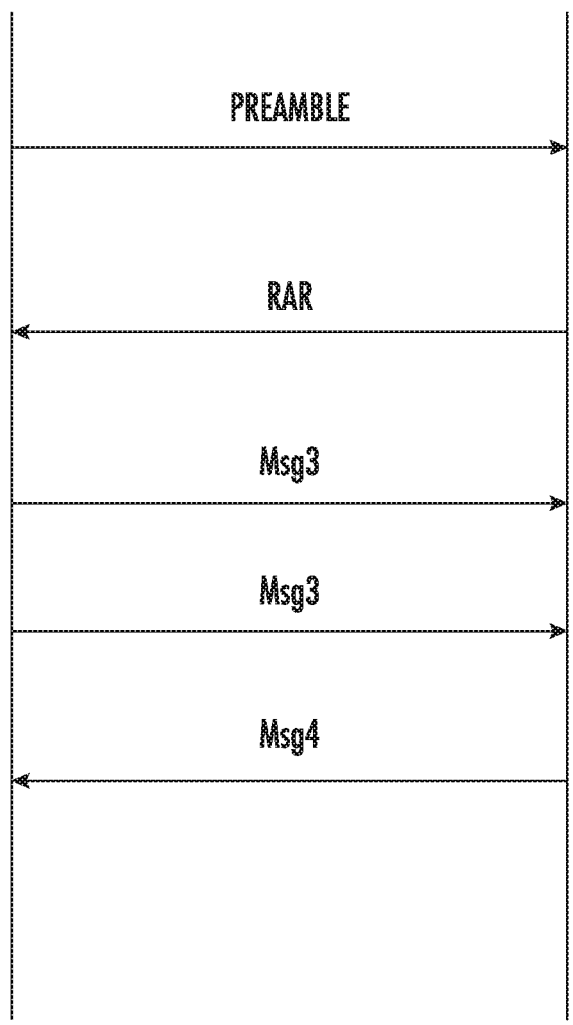
FIG. 4 shows an exchange of messages for random access responses.

One option to increase coverage is to use autonomous Msg3 retransmissions (repetitions). This would also reduce latency compared to relying on normal HARQ retransmissions. Repetitions are already available for PUSCH transmissions and is governed by the WD-specific "pusch-AggregationFactor" parameter in the PUSCH-Config IE. The gain in latency compared to normal HARQ retransmissions may depend on uplink (UL)/downlink (DL) configurations in case of time division duplexing (TDD). An illustration of Msg3 repetition is shown in FIG. 4 where two Msg3 messages are transmitted.

Introducing Msg3 repetitions for increased coverage may introduce additional latency and increase PUSCH resource consumption compared to single Msg3 transmission. Having the possibility to transmit 56-bit messages without repetitions may therefore still be advantageous, i.e., Msg3 repetitions might only be used in case of larger grants.

Msg3 repetitions could be signaled in different ways. One way is to include the Msg3 in system information block 1 (SIB1). However, this may not have enough granularity. As mentioned above, introducing autonomous repetitions for all Msg3 transmissions may cause the 56-bit grants to be inadequate to handle increased PUSCH resource consumption and extra latency compared to single transmission. Another option is to configure Msg3 in SIB1 but only apply the Msg3 for Msg3 size above a threshold, e.g., when Random Access preamble group B is used or if, for example, the grant is above a threshold. However, in order to have full flexibility for using Msg3 repetitions, an indication may be carried in the RAR message utilizing some of the reserved bits. This would enable the base station (gNB) to configure the repetitions on an as needed basis, e.g., depending on grant size, cell load and deployment.

Since the reason for the random access is unknown to the gNB, the size of the grant is also unknown to the gNB. Of course, the gNB could always give a large enough grant to fit all possible Msg3 and use a high number of repetitions. However, this approach might be wasteful regarding physical downlink control channel (PDCCH) and physical uplink shared channel (PUSCH) resources and latency.

Another option to handle grant assignment is to use a minimum grant for contention based random access (CBRA) using random access preamble group A, i.e., setting the ra-Msg3SizeGroupA to the size of the smallest RRC messages (e.g., 56 bits). If the WD wishes to transmit a Msg3 larger than this, the WD may select the random access preamble group B which informs the gNB to reply with a larger grant. Random access preamble group B could then handle cases requiring a larger grant such as RRC Resume Request.

According to 3GPP TS 38.321 v. 15.1.0, using Preamble group B also assumes that the path loss is low enough or that the messagePowerOffsetGroupB is configured to handle the larger Msg3 sizes regardless of path loss. This can be achieved by configuring it to minusinfinity.

An alternative solution is to allow selection of random access preamble group B ignoring the path loss for common control channel (CCCH) transmissions as in LTE. This would allow the path loss to be considered for Random Access preamble group B when Msg3 is not a CCCH transmission.

Using the random access preamble group B to indicate a need for a larger Msg3 will also implicitly indicate the need for repetitions. Random access preamble group A could then be used for the minimum grant of 56 bits and typically use no repetitions. The random access preamble group B would then be used for larger Msg3, e.g., for RRC Resume with repetitions. Depending on the grant size (72 bits or more), the gNB could indicate the number of repetitions in the RAR to ensure sufficient coverage. This approach will enable a high degree of flexibility to ensure both low latency for minimum size grants and ensure coverage for larger grants.

NR supports a large range in possible transport block size (TBS). Theoretically, Msg3 can be scheduled up to the full bandwidth of 273 PRBs. Calculating the TBS according to section 5.1.3 of 3GPP TS 38.214 v. 15.1.0, the Msg3 payload for the two extreme cases (1 PRB allocation and 273 PRB allocation within a BWP), leads to the following features:
  Non-slot scheduling of 2 symbols of which 1 OFDM symbol is used for data and 1 OFDM symbol may be used for DMRS;
  Minimum TBS may be 3 bytes (for MCS0) and maximum TBS may be 976 bytes (for MCS15);
  Slot-based scheduling of 14 symbols, 3 OFDM symbols may be used for DMRS and 11 OFDM symbols may be used for data; and
  Minimum TBS may be 3 bytes (for MCS0) and maximum TBS may be 10755 bytes (for MCS15).

However, the coverage of Msg3 may be limited if 273 PRBs are used, as the WD distributes the power over a large bandwidth and Msg3 has problems reaching the cell edge. Hence, there may be a tradeoff between the payload size and coverage.

Looking at the typical payloads considered by RAN2, the frequency allocation table can be designed accordingly to make sure the typical Msg3 payload can be robustly received.

Figure 5:
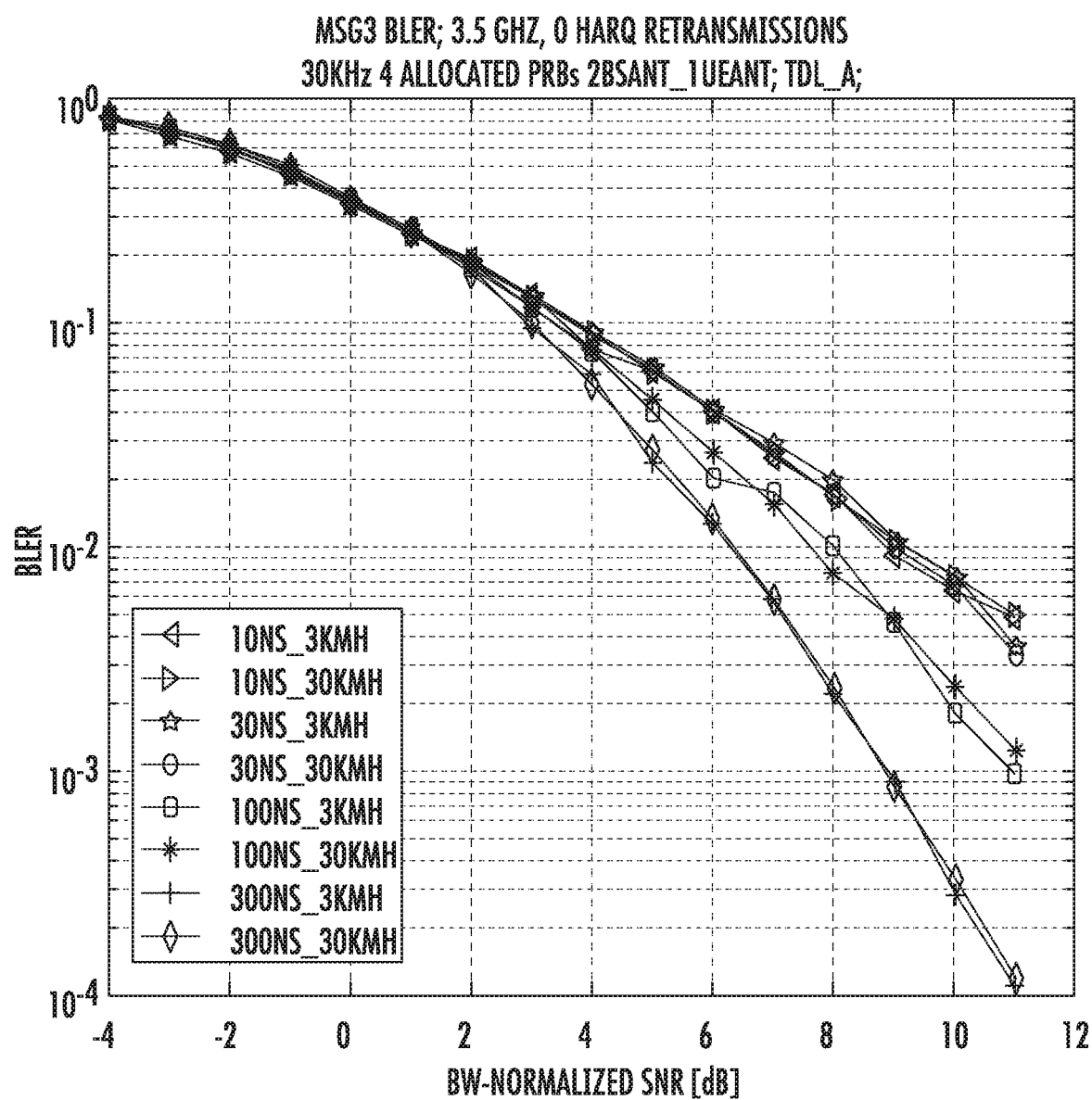
FIG. 5 is a graph of Msg3 block error rate.

FIG. 5 shows the BLER as a function of BW-normalized SNR in order to make a fair comparison for different number of PRBs. The maximum output power may be limited and spread evenly across the allocated PRBs. The simulation in FIG. 5 is for 3.5 GHz carrier frequencies, 4 PRBs allocated with modulation and coding scheme (MCS) index 0 (equivalent to 15 bytes of Msg3 payload), no HARQ retransmissions, 2 receive antennas at the base station and 1 transmit antenna at the WD. The different curves correspond to different delay spreads and WD speeds as indicated in the legends. We observed that 10% BLER can be obtained around 3 dB.

The same analysis has been performed for different carrier frequencies, for different HARQ retransmissions, for slot-based transmission, and a summary of approximate SNRs for 10% BLER is provided in Table 3. A wide range of SNRs can be supported, depending on number of retransmissions and Msg3 payload size.

TABLE 3

| Number of PRBs | HARQ Retrans-missions | BW-normalized SNR at 10% BLER (dB) | MCS_index | TBS (in bytes) |
|---|---|---|---|---|
| 2 | 0 | 1 | 0 | 7 |
| 2 | 1 | −3 | 0 | 7 |
| 2 | 2 | −5 | 0 | 7 |
| 2 | 3 | −6 | 0 | 7 |
| 4 | 0 | 3 | 0 | 15 |
| 4 | 1 | 0 | 0 | 15 |
| 4 | 2 | −2 | 0 | 15 |
| 4 | 3 | −3 | 0 | 15 |
| 5 | 0 | 4 | 0 | 19 |
| 5 | 1 | 0 | 0 | 19 |
| 5 | 2 | −1 | 0 | 19 |
| 5 | 3 | −2 | 0 | 19 |
| 6 | 0 | 5 | 0 | 23 |
| 6 | 1 | 1 | 0 | 23 |
| 6 | 2 | −1 | 0 | 23 |
| 6 | 3 | −2 | 0 | 23 |

Embodiments provide signaling mechanisms for transmitting random access response messages and receiving messages related to random access, such as random access response resolution messages such as Msg3 messages and physical uplink shared channel (PUSCH) repetitions. In some embodiments, a network node determines an indication of a number of zero or more repetitions of a random access response, RAR, resolution message to be transmitted by the WD in response to an RAR message. The network node transmits the indication of the number of zero or more repetitions of a random access response, RAR, resolution message to be transmitted by the WD in response to an RAR message to the WD. The network node further receives at least one RAR resolution message and at least one of the indicated number of zero or more repetitions of the RAR resolution message on a physical uplink shared channel, PUSCH.

Figure 6:
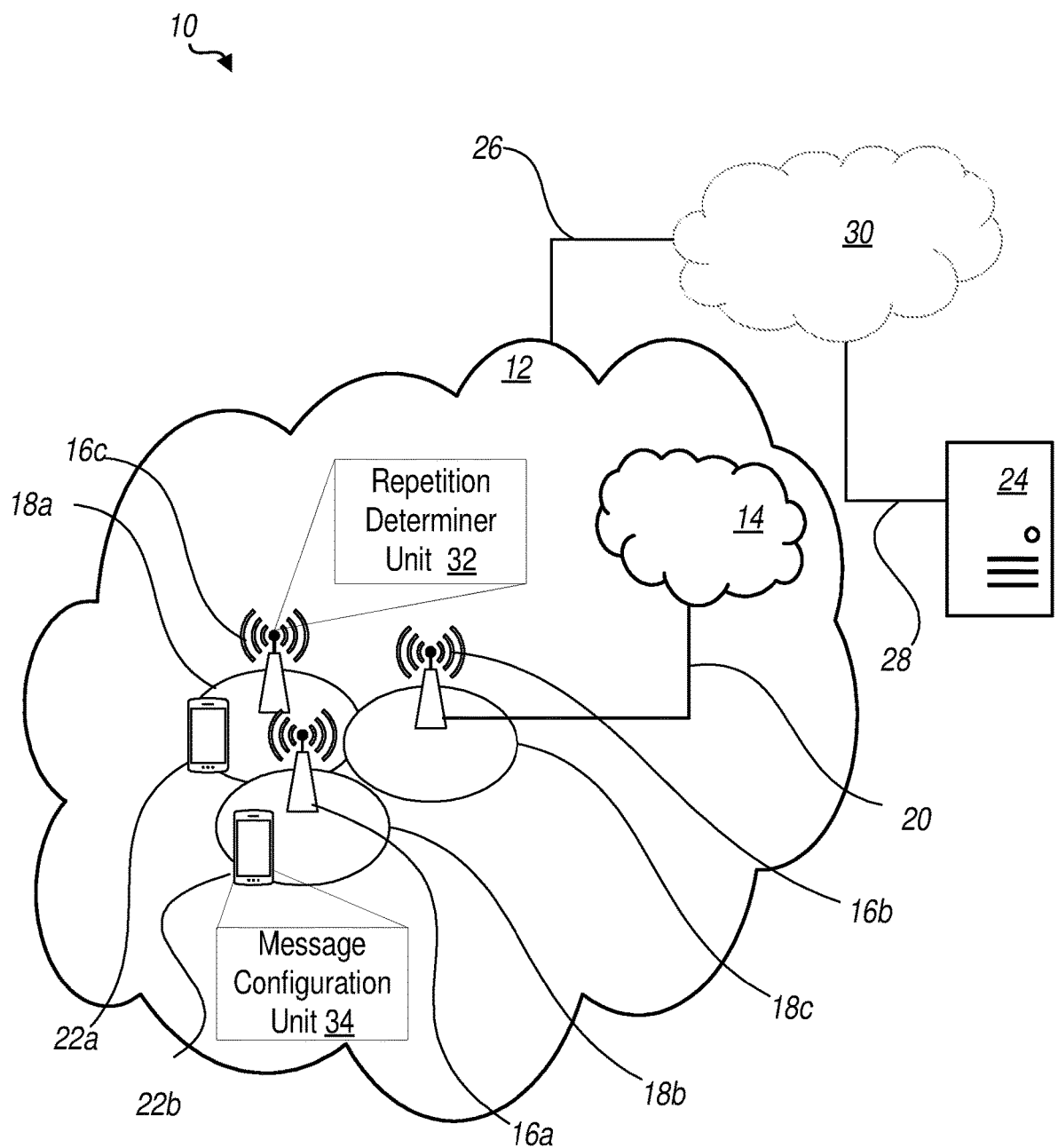
FIG. 6 is a schematic diagram of an exemplary network architecture illustrating a communication system connected via an intermediate network to a host computer according to the principles in the present disclosure.

Returning now to the drawing figures, in which like elements are referred to by like reference numerals, there is shown in FIG. 6 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 6 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a repetition determiner unit 32 which is configured to determine an indication of a number of zero or more repetitions of a message related to random access to be transmitted by the WD in response to an RAR message. A wireless device 22 is configured to include a message configuration unit 34 which is configured to configure a message related to RA according to an indicated number of repetitions.

Example implementations, in accordance with an embodiment, of the WD 22, network node 16 and host computer 24 discussed in the preceding paragraphs will now be described with reference to FIG. 7. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include the repetition determiner unit 32 configured to determine an indication of a number of zero or more repetitions of a message related to random access to be transmitted by the WD in response to an RAR message.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a message configuration unit 34 which is configured to configure an RAR message according to an indicated number of repetitions.

Figure 7:
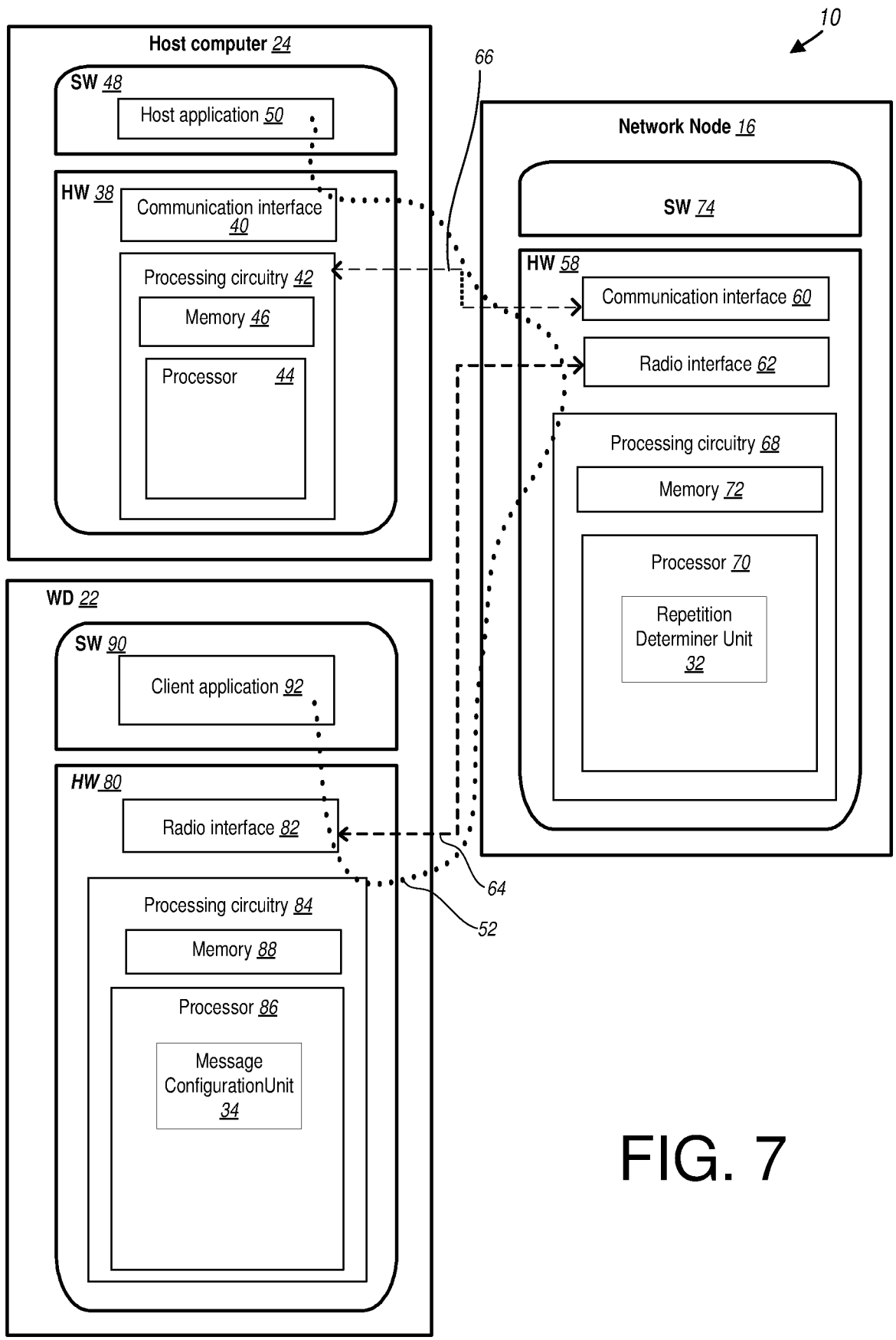
FIG. 7 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 7 and independently, the surrounding network topology may be that of FIG. 6.

In FIG. 7, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 6 and 7 show various "units" such as repetition determiner unit 32, and message configuration unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 8:
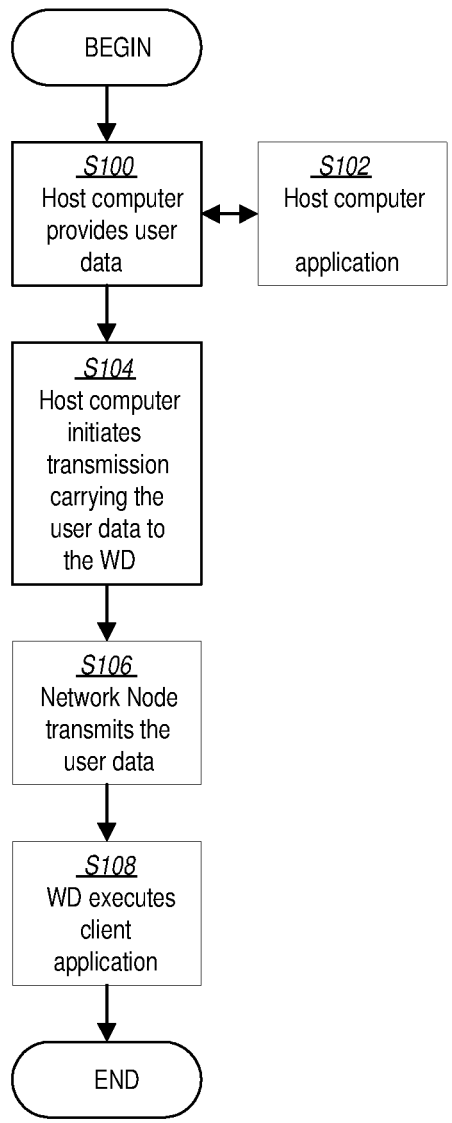
FIG. 8 is a flowchart illustrating exemplary methods implemented in a communication system including a host computer, a network node and a wireless device for executing a client application at a wireless device according to some embodiments of the present disclosure.

FIG. 8 is a flowchart illustrating an exemplary method implemented in a communication system, such as, for example, the communication system of FIGS. 6 and 7, in accordance with one embodiment. The communication system may include a host computer 24, a network node 16 and a WD 22, which may be those described with reference to FIG. 7. In a first step of the method, the host computer 24 provides user data (block S100). In an optional substep of the first step, the host computer 24 provides the user data by executing a host application, such as, for example, the host application 50 (block S102). In a second step, the host computer 24 initiates a transmission carrying the user data to the WD 22 (block S104). In an optional third step, the network node 16 transmits to the WD 22 the user data which was carried in the transmission that the host computer 24 initiated, in accordance with the teachings of the embodiments described throughout this disclosure (block S106). In an optional fourth step, the WD 22 executes a client application, such as, for example, the client application 114, associated with the host application 50 executed by the host computer 24 (block S108).

Figure 9:
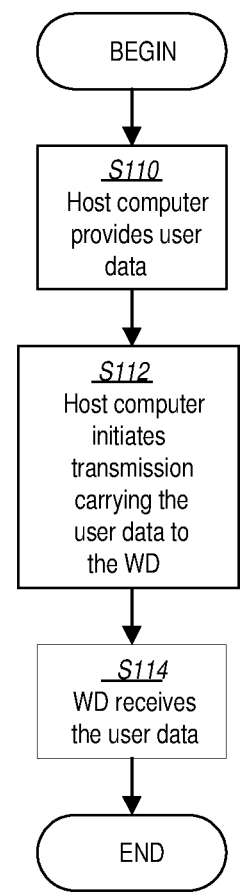
FIG. 9 is a flowchart illustrating exemplary methods implemented in a communication system including a host computer, a network node and a wireless device for receiving user data at a wireless device according to some embodiments of the present disclosure.

FIG. 9 is a flowchart illustrating an exemplary method implemented in a communication system, such as, for example, the communication system of FIG. 6, in accordance with one embodiment. The communication system may include a host computer 24, a network node 16 and a WD 22, which may be those described with reference to FIGS. 6 and 7. In a first step of the method, the host computer 24 provides user data (block S110). In an optional substep (not shown) the host computer 24 provides the user data by executing a host application, such as, for example, the host application 50. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

Figures 10, 11:
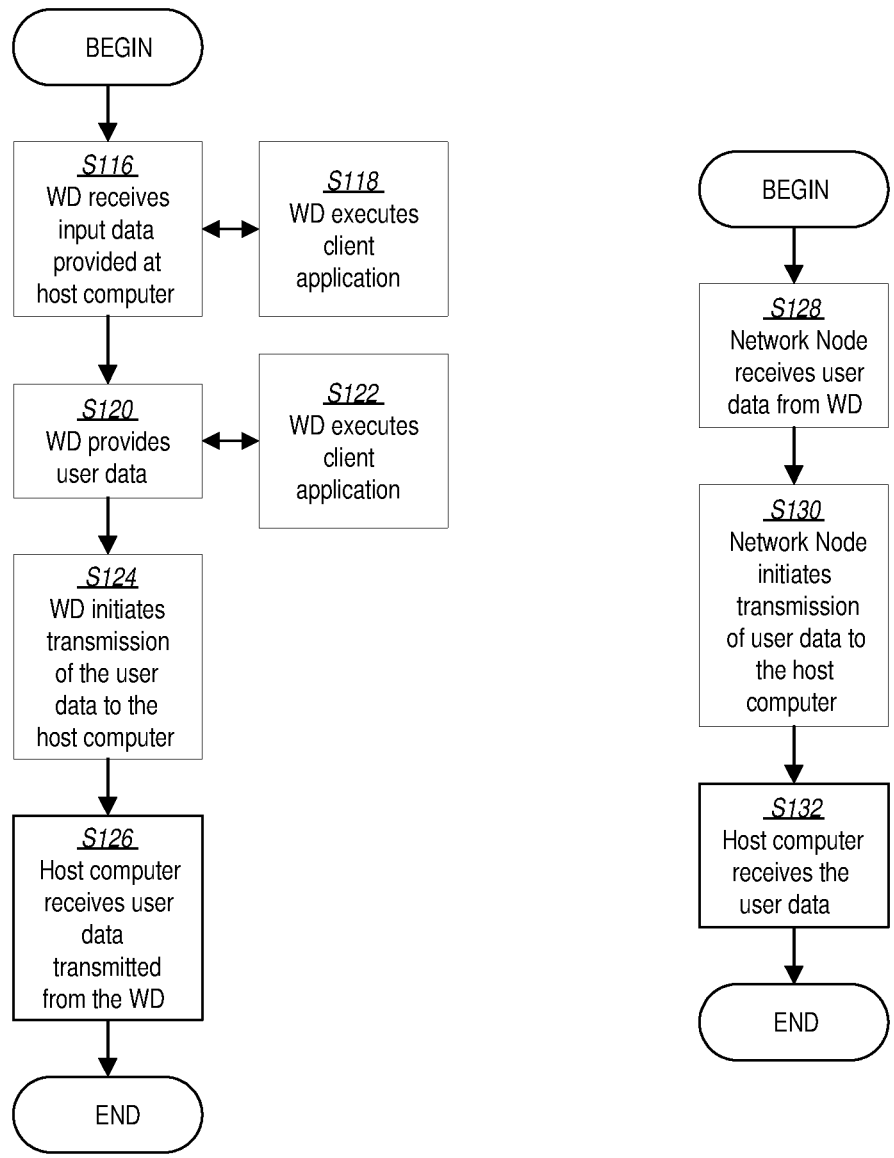
FIG. 10 is a flowchart illustrating exemplary methods implemented in a communication system including a host computer, a network node and a wireless device for receiving user data from the wireless device at a host computer according to some embodiments of the present disclosure.
FIG. 11 is a flowchart illustrating exemplary methods implemented in a communication system including a host computer, a network node and a wireless device for receiving user data at a host computer according to some embodiments of the present disclosure.

FIG. 10 is a flowchart illustrating an exemplary method implemented in a communication system, such as, for example, the communication system of FIG. 6, in accordance with one embodiment. The communication system may include a host computer 24, a network node 16 and a WD 22, which may be those described with reference to FIGS. 6 and 7. In an optional first step of the method, the WD 22 receives input data provided by the host computer 24 (block S116). In an optional substep of the first step, the WD 22 executes the client application 114, which provides the user data in reaction to the received input data provided by the host computer 24 (block S118). Additionally or alternatively, in an optional second step, the WD 22 provides user data (block S120). In an optional substep of the second step, the WD provides the user data by executing a client application, such as, for example, client application 114 (block S122). In providing the user data, the executed client application 114 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

FIG. 11 is a flowchart illustrating an exemplary method implemented in a communication system, such as, for example, the communication system of FIG. 6, in accordance with one embodiment. The communication system may include a host computer 24, a network node 16 and a WD 22, which may be those described with reference to FIGS. 6 and 7. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 12:
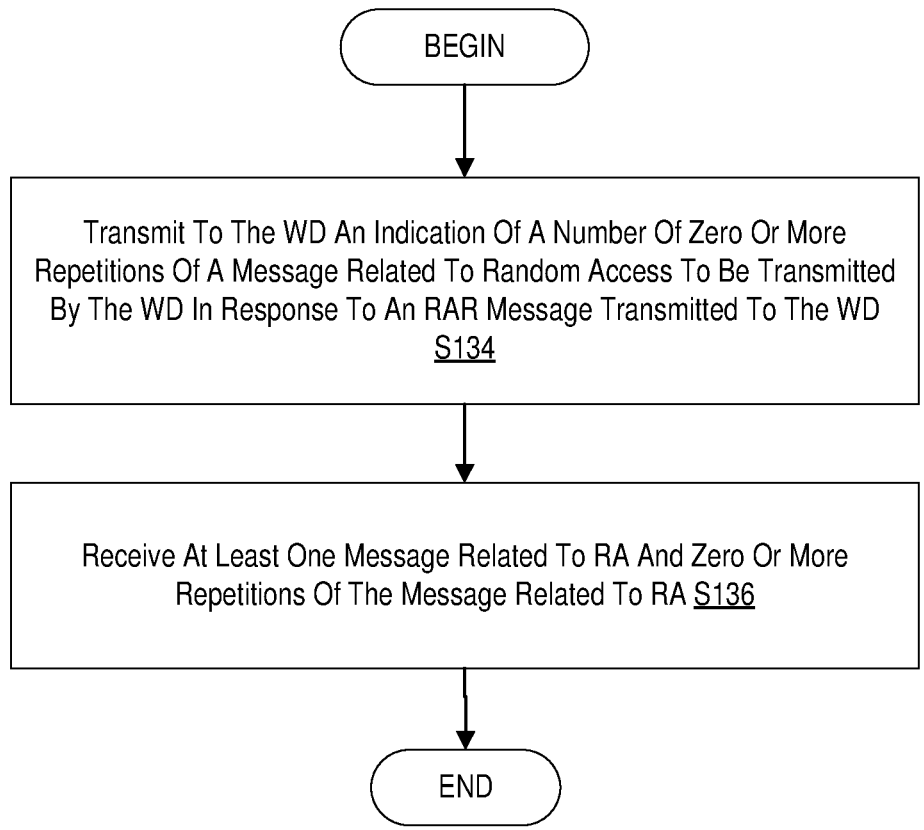
FIG. 12 is a flowchart of an exemplary process in a network node according to some embodiments of the present disclosure.

FIG. 12 is a flowchart of an exemplary process in a network node 16 for signaling mechanisms for messages such as Msg3 and physical uplink shared channel (PUSCH) repetitions. One or more blocks described herein may be performed by one or more elements of network node 16 such as by one or more of processing circuitry 68 (including the repetition determiner unit 32), processor 70, radio interface 62 and/or communication interface 60. Network node 16 such as via processing circuitry 68 and/or processor 70 and/or radio interface 62 and/or communication interface 60 is configured to transmit to the WD an indication of a number of zero or more repetitions of a message related to random access, RA, to be transmitted by the WD in response to an RAR message to the WD (Block S134). The process also includes receiving at least one message related to RA and zero or more repetitions of the message related to RA (Block S136)

Figure 13:
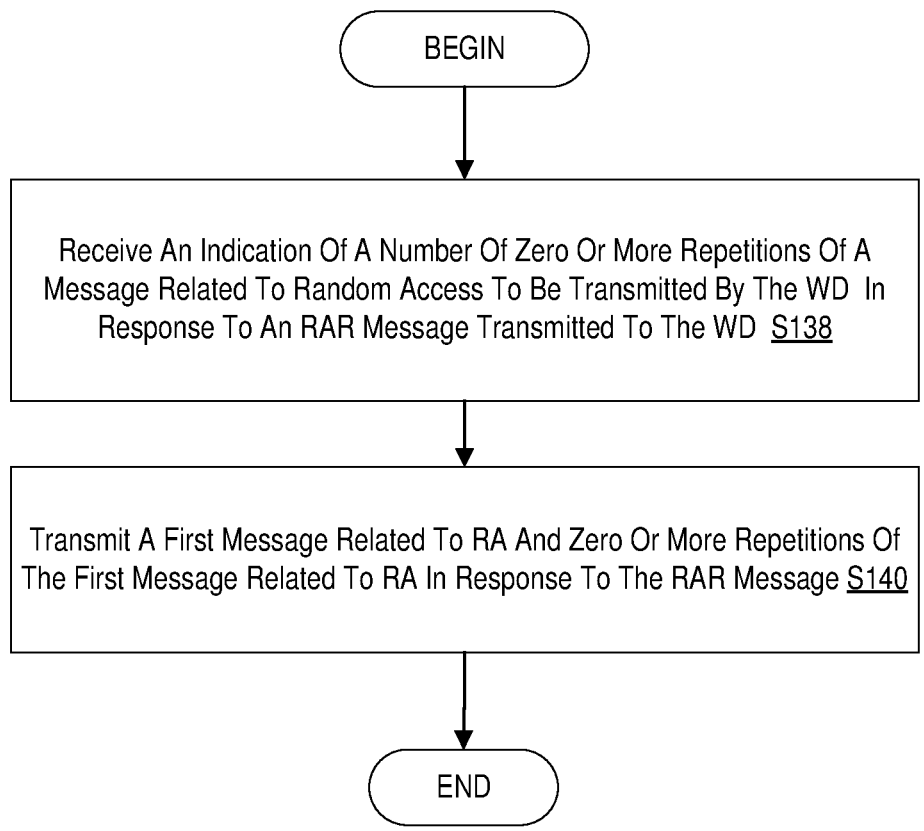
FIG. 13 is a flowchart of an exemplary process in a wireless device according to some embodiments of the present disclosure.

FIG. 13 is a flowchart of an exemplary process in a wireless device 22 according to some embodiments of the present disclosure. One or more blocks described herein may be performed by one or more elements of wireless device 22 such as by one or more of processing circuitry 84 (including the Message Configuration Unit 34), processor 86, radio interface 82 and/or communication interface 60. Wireless device 22 such as via processing circuitry 84 and/or processor 86 and/or radio interface 82 is configured to receive an indication of a number of zero or more repetitions of a message related to random access, RA, to be transmitted by the WD in response to an RAR message transmitted to the WD (Block S138). The process also includes transmitting a first message related to RA and zero or more repetitions of the first message related to RA in response to the RAR message (Block S140).

The process includes receiving, via the radio interface 82 from the network node 16 an aggregation factor indicating a number of repetitions of a message and a physical uplink shared channel, PUSCH, to be transmitted by the WD 22 and a frequency hopping, FH, value to be interpreted by the WD 22 according to a predetermined definition for determining a frequency hopping operation of the WD 22 (block S138). The process also includes transmitting, via the radio interface 82, from the WD 22 the message, configured by the message configuration unit, and the PUSCH according to the indicated number of repetitions and frequency hopping value (block S140).

Having described the general process flow of arrangements of the disclosure and having provided examples of hardware and software arrangements for implementing the processes and functions of the disclosure, the sections below provide details and examples of arrangements for signaling mechanisms for message and physical uplink shared channel (PUSCH) repetitions.

Aggregation and repetition of normal UL PUSCH data is already supported in NR, and the following passages are from NR specifications:

Section 6.1.2 of 3GPP TS 38.214 v. 15.1.0 states, "When the WD is configured with aggregationFactorUL>1, the same symbol allocation is applied across the aggregationFactorUL consecutive slots and the PUSCH is limited to a single transmission layer. The WD shall repeat the TB across the aggregationFactorUL consecutive slots applying the same symbol allocation in each slot."

Section 6.3.2 of 3GPP TS 38.331 v. 15.1.0, defines this aggregation factor as "PUSCH-AggregationFactor ENUMERATED {n2, n4, n8}."

However, note that PUSCH-AggregationFactor for Msg3 cannot be used to indicate a number of repetitions for the message related to RA because PUSCH-AggregationFactor for Msg3 is signaled to the WD 22 after initial access is completed through RRC signaling. In some embodiments, an aggregation (or repetition) can be signaled for Msg3. This aggregation factor can be signaled in 2 of the 3 reserved bits in an RAR payload. Alternatively, these potential PUSCH-AggregationFactors can be indicated in higher layers in system information block 1 (SIB1) and an index can be signaled in the reserved bits of the RAR payload. Using the latter approach, if in the future, change in aggregationfactor values is desired, this can be done in the SIB1 while still indexing in 2 of the reserved bits of RAR payload. The value of aggregation factors for Msg3 can be hardcoded in specifications just as the aggregation factor values can be hardcoded for the PUSCH, which are 1, 2, 4 or 8 or are configured via higher layer signaling using other values.

When aggregation/repetition is used for Msg3/PUSCH, then the frequency hop (FH) field can be interpreted in more than one way. The frequency domain resource allocation type 1 that is used by Msg3 can support both intra-slot and inter-slot hopping. The FH field also depends on whether intra-slot and inter-slot hopping is to be implemented.

In one embodiment, the following interpretations may be implemented:
When aggregation=1, (no repetition) FH=1 means intra-slot;
When aggregation >1, FH=1 means inter-slot; and
FH=0 means no frequency hopping irrespective of aggregationFactor.

In another embodiment, the following interpretations may be implemented:
FH=1 always means intra-slot irrespective of aggregationFactor; and
FH=0 means no frequency hopping irrespective of aggregationFactor.

In another embodiment:
The transmission of Msg3/PUSCH FH=1 means inter-slot. (The hopping flag is received in the physical downlink control channel (PDCCH) carrying Msg3/PUSCH retransmission information.)

In another embodiment, the following interpretations may be implemented: 2 bits for the FH flag, where these 2 bits can indicate whether to use intra-slot, inter-slot, both intra-slot and inter-slot, or no hopping. Depending on the aggregation Factor and Msg3-tp values, and based on the quality of the channel, the network may choose which of these combinations of which to configure the WD 22. For example, if aggregation>1 with Msg3-tp enabled, and:
if the channel is poor and frequency diversity would be beneficial, then the network can indicate both intra-slot and inter-slot FH; and
If the channel is reasonably good, then the network can indicate either inter-slot or intra-slot depending on the channel quality.

Channel quality for initial access can be estimated by the network based on Msg1 preamble quality detection.

In another embodiment, the TPC field of the RAR payload may be jointly optimized depending on the value of the aggregationFactor. For example, the TPC field may be 3 bits when aggregationFactor=1 (no repetition) but can be 2 or 1 bit when aggregation>1 and the resulting extra bits can be reused for some other purposes.

In another embodiment, the number of repetitions/aggregationFactor may be dependent on the length of Msg3. Msg3 length can either determine the number of repetitions/aggregationFactor directly or the Msg3 length may determine no repetition (and the number of repetitions would be determined via configuration received via physical broadcast channel (PBCH)/SIB1).

In another embodiment, the number of repetitions/aggregationFactor may depend on the payload of Msg3. The Msg3 payload can either determine the number of repetitions/aggregationFactor directly or the Msg3 payload may indicate no repetition or repetition (and the number of repetitions would be determined via configuration received, e.g., via PBCH/SIB1). This embodiment can be stand-alone or it can be combined with the previous embodiment, i.e., repetition is determined for certain combinations of Msg3 duration and payload.

In another embodiment, the determination of no repetition or repetition can also depend on the physical random access channel (PRACH) preamble group from which the WD 22 selected the PRACH preamble. This embodiment can be stand-alone, or it can be combined with any of the two previous embodiments.

In another embodiment, the frequency allocation, and time-domain allocation for repetitions of Msg3 can use the same values as in normal Msg3. The redundancy version for Msg3 repetitions can use {0, 3} or {0, 2} for repetition of 2 and {0, 2, 3, 1} for repetition of 4 or 8.

In another embodiment, another behavior for Msg3/PUSCH repetition could be such that WD 22 continues with Msg3/PUSCH repetition across non-contiguous UL slots until the total number of repetitions defined by the aggregation factor is met (as opposed to standard PUSCH repetition behavior where PUSCH is only repeated across contiguous slots). Higher layer signaling could be used to define which Msg3/PUSCH repetition behavior WD 22 should follow.

In another embodiment, Msg3 repetition stops after an early-stop signal for Msg3 is received. The Msg3 repetition will be terminated after receiving a physical downlink control channel (PDCCH) scrambled with TC-RNTI or when the number of repetitions are finished. The PDCCH could be for Msg4 UL or DL assignment, which indicates a successful receiving of Msg3, or retransmission of Msg3 (adaptive transmission). The network then decides that even the remaining repetition will not be sufficient for a successful Msg3 and does rescheduling with, for example, lower data rate or different time/frequency domain resource allocations.

Thus, according to one aspect a network node 16 configured to communicate with a wireless device, WD 22, is provided. The network node 16 may include processing circuitry 68 configured to determine an indication of a number of zero or more repetitions of a message related to random access to be transmitted by the WD 22 in response to an RAR message. The network node 16 includes a transceiver (radio interface) 62 configured to transmit an indication of the number of zero or more repetitions of a message related to random access, RA, to be transmitted by the WD 22 in response to an RAR message transmitted to the WD 22. The transceiver 62 is also configured to receive at least one message related to RA and zero or more repetitions of the message related to RA.

The indication of the number of zero or more repetitions of the message related to RA, to be transmitted by the WD in response to a RAR message, may be transmitted to the WD via a physical broadcast channel and/or shared channel. Alternatively or additionally, it may be transmitted to the WD in the RAR message. In one example, the WD may be configured, by the network node or by another network node, with indices and corresponding numbers of zero or more repetitions of the message related to RA via the physical broadcast channel and/or shared channel. An index corresponding to a selected or determined number of zero or more repetitions of the message related to RA to be transmitted by the WD in response to a RAR message may then be transmitted as the indication of the selected or determined number of zero or more repetitions in the RAR message to the WD when the WD has initiated an RA procedure. The number of zero or more repetitions of the message related to RA to be transmitted by the WD may be selected or determined by the network node and the RAR message may be transmitted to the WD by the network node. The message related to RA may for example be an RAR resolution message, such as an Msg3.

According to this aspect, in some embodiments, the processing circuitry 68 is further configured to determine a number of bits of a transmission power control, TPC, field based at least in part on the indicated number of zero or more repetitions of the message related to RA. In some embodiments, the indicated number of zero or more repetitions is indicated by an aggregation factor. In some embodiments, the indicated number of zero or more repetitions is indicated at least in part by a length of the message related to RA. In some embodiments, the indicated number of zero or more repetitions is indicated at least in part by a payload of the message related to RA. In some embodiments, the transceiver 62 is further configured to transmit an early-stop signal to stop a number of repetitions by the WD 22 of the message related to RA prior to receipt of the indicated number of repetitions of the message related to RA. In some embodiments, the transceiver 62 is further configured to transmit a frequency hop, FH, field to indicate whether the message related to RA is transmitted using inter-slot frequency hopping, intra-slot frequency hopping or no frequency hopping. In some embodiments, the FH field is interpreted based at least in part on an aggregation factor that indicates the number of zero or more repetitions of the message related to RA.

According to another aspect, a method implemented by a network node 16 configured to communicate with a wireless device, WD 22, is provided. The method includes transmitting to the WD 22 an indication of a number of zero or more repetitions of a message related to random access, RA, to be transmitted by the WD 22 in response to an RAR message transmitted to the WD 22. The method also includes receiving at least one message related to random access and zero or more repetitions of the message related to random access. In some embodiments, the message related to random access may be received on the PUSCH.

According to this aspect, in some embodiments, the method further includes determining a number of bits of a transmission power control, TPC, field based at least in part on the indicated number of zero or more repetitions of the message related to RA. In some embodiments, the indicated number of zero or more repetitions is indicated by an aggregation factor. In some embodiments, the indicated number of zero or more repetitions is indicated at least in part by a length of the message related to RA. In some embodiments, the indicated number of zero or more repetitions is indicated at least in part by a payload of the message related to RA. In some embodiments, the method further includes transmitting an early-stop signal to stop a number of repetitions by the WD 22 of the message related to RA prior to receipt of the indicated number of repetitions of the message related to RA. In some embodiments, the method further includes transmitting a frequency hop, FH, field to indicate whether the message related to RA is transmitted using inter-slot frequency hopping, intra-slot frequency hopping or no frequency hopping. In some embodiments, the FH field is interpreted based at least in part on an aggregation factor that indicates the number of zero or more repetitions of the message related to RA.

According to yet another aspect, a wireless device, WD 22, configured to communicate with a network node 16, is provided. The WD 22 includes a transceiver (radio interface)

82 configured to receive an indication of a number of zero or more repetitions of a message related to random access, RA, to be transmitted by the WD 22 in response to the RAR message, which RAR message may be received from the network node. The transceiver 82 is further configured to transmit a first message related to RA and zero or more repetitions of the message related to the RA in response to receiving the RAR message, which may be received from the network node.

According to this aspect, in some embodiments, the indication of the number of zero or more repetitions is determined at least in part from a physical random access channel preamble. In some embodiments, one or more repetitions of the message related to RA are transmitted using the same frequency and time allocation values as used to transmit the first message related to RA. In some embodiments, the WD 22 further includes processing circuitry 84 configured to cause the transceiver to transmit one or more repetitions of the message related to RA across non-contiguous uplink slots. In some embodiments, the WD 22 further includes processing circuitry 84 configured to cause the transceiver to cease transmission of repetitions of the message related to RA upon receipt from the network node 16 of an early-stop signal. According to another aspect, a method implemented in a wireless device, WD 22, configured to communicate with a network node 16, is provided. The method includes receiving an indication of a number of zero or more repetitions of a message related to random access, RA, to be transmitted by the WD 22 in response to a RAR message transmitted to the WD. The method also includes transmitting a first message related to RA and zero or more repetitions of the first message related to RA in response to receiving the RAR message.

According to this aspect, in some embodiments, the indication of the number of zero or more repetitions is determined at least in part from a physical random access channel preamble. In some embodiments, one or more repetitions of the first message related to RA are transmitted using the same frequency and time allocation values as used to transmit the first message related to RA. In some embodiments, the method includes transmitting one or more repetitions of the first message related to the RA across non-contiguous uplink slots. In some embodiments, the method further includes ceasing transmission of repetitions of the first message related to RA upon receipt from the network node 16 of an early-stop signal.

In some embodiments, a network node 16 configured to communicate with a wireless device (WD 22) is provided. The network node 16 has processing circuitry configured to transmit to the WD 22 an aggregation factor indicating a number of repetitions of a message and physical uplink shared channel, PUSCH, to be transmitted by the WD 22 and a frequency hopping, FH, value to be interpreted by the WD 22 according to a predetermined definition for determining a frequency hopping operation of the WD 22. The processing circuitry is also configured to receive from the WD 22 a message and PUSCH according to the indicated number of repetitions and FH value.

In some embodiments, the predetermined definition of the FH value indicates whether frequency hopping is to be performed and if so, whether the frequency hopping is intra-slot or inter-slot. In some embodiments, wherein the predetermined definition of the FH value depends on whether the aggregation factor is one of 0, 1 and greater than 1. In some embodiments, the predetermined definition of the FH value depends on channel quality. In some embodiments, a number of bits to represent a transmission power control, TPC, command depends on a value of the aggregation factor.

In some embodiments, a method implemented in a network node 16 includes transmitting to the WD 22 an aggregation factor indicating a number of repetitions of a message and physical uplink shared channel, PUSCH, to be transmitted by the WD 22 and a frequency hopping, FH, value to be interpreted by the WD 22 according to a predetermined definition for determining a frequency hopping operation of the WD 22. The method also includes receiving from the WD 22 a message and the PUSCH according to the indicated number of repetitions and the FH value.

In some embodiments, a wireless device (WD 22) is configured to communicate with a network node 16, the WD 22 configured to receive from the network node 16 an aggregation factor indicating a number of repetitions of a message and a physical uplink shared channel, PUSCH, to be transmitted by the WD 22 and a frequency hopping, FH, value to be interpreted by the WD 22 according to a predetermined definition for determining a frequency hopping operation of the WD 22. The wireless device is further configured to transmit from the WD 22 the message and the PUSCH according to the indicated number of repetitions and frequency hopping value.

In some embodiments, a method in a WD 22 includes receiving from the network node 16 an aggregation factor indicating a number of repetitions of a message and a physical uplink shared channel, PUSCH, to be transmitted by the WD 22 and a frequency hopping, FH, value to be interpreted by the WD 22 according to a predetermined definition for determining a frequency hopping operation of the WD 22. The method also includes transmitting from the WD 22 the message and the PUSCH according to the indicated number of repetitions and frequency hopping value. In some embodiments, the message is an Msg3 message. As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A network node configured to communicate with a wireless device, WD, the network node comprising:
a transceiver configured to:
transmit an indication of a number of zero or more repetitions of a message related to random access, RA, to be transmitted by the WD in response to a random access response, RAR, message transmitted to the WD;
receive at least one message related to RA and zero or more repetitions of the message related to RA; and
transmit a frequency hop, FH, field to indicate whether the message related to RA is transmitted using one of inter-slot frequency hopping and intra-slot frequency hopping, the FH field being interpreted based at least in part on an aggregation factor that indicates the number of zero or more repetitions of the message related to RA,
the FH field interpretation is implemented so that:
when the aggregation factor=1, (no repetition) FH=1 means intra-slot;
when the aggregation factor >1, FH=1 means inter-slot; and
FH=0 means no frequency hopping irrespective of the aggregation factor.

2. The network node of claim 1, further comprising processing circuitry configured to determine a number of bits of a transmission power control, TPC, field based at least in part on the indicated number of zero or more repetitions of the message related to RA.

3. The network node of claim 1, wherein the indicated number of zero or more repetitions is indicated at least in part by a length of the message related to RAR.

4. The network node of claim 1, wherein the indicated number of zero or more repetitions is indicated at least in part by a payload of the message related to RAR.

5. The network node of claim 1, wherein the transceiver is further configured to transmit an early-stop signal to stop a number of repetitions by the WD of the message related to RA prior to receipt of the indicated number of repetitions of the message related to RA.

6. A method implemented by a network node configured to communicate with a wireless device, WD, the method comprising:
transmitting to the WD an indication of a number of zero or more repetitions of a message related to random access, RA, to be transmitted by the WD in response to a random access response, RAR, message transmitted to the WD;
receiving at least one message related to RA and zero or more repetitions of the message related to RA; and
transmitting to the WD a frequency hop, FH, field to indicate whether the message related to RA is transmitted using one of inter-slot frequency hopping and intra-slot frequency hopping, the FH field being interpreted based at least in part on an aggregation factor that indicates the number of zero or more repetitions of the message related to RA,
the FH field interpretation is implemented so that:
in response to the aggregation factor=1, (no repetition) FH=1 means intra-slot;
in response to the aggregation factor >1, FH=1 means inter-slot; and
FH=0 means no frequency hopping irrespective of the aggregation factor.

7. The method of claim 6, further comprising determining a number of bits of a transmission power control, TPC, field based at least in part on the indicated number of zero or more repetitions of the message related to RA.

8. The method of claim 6, wherein the indicated number of zero or more repetitions is indicated at least in part by a length of the message related to RAR.

9. The method of claim 6, wherein the indicated number of zero or more repetitions is indicated at least in part by a payload of the message related to RAR.

10. A wireless device, WD, configured to communicate with a network node, the WD comprising a transceiver configured to:
- receive an indication of a number of zero or more repetitions of a message related to random access, RA, to be transmitted by the WD in response to a random access response, RAR, message transmitted to the WD;
- transmit a first message related to RA and zero or more repetitions of the first message related to RA in response to receiving the RAR message; and
- transmit a frequency hop, FH, field to indicate whether the message related to RA is transmitted using one of inter-slot frequency hopping and intra-slot frequency hopping, the FH field being interpreted based at least in part on an aggregation factor that indicates the number of zero or more repetitions of the message related to RA, the FH field interpretation is implemented so that:
- when the aggregation factor=1, (no repetition) FH=1 means intra-slot;
- when the aggregation factor >1, FH=1 means inter-slot; and
- FH=0 means no frequency hopping irrespective of the aggregation factor.

11. The WD of claim 10, wherein the indication of the number of zero or more repetitions is determined at least in part from a physical random access channel preamble.

12. The WD of claim 10, wherein one or more repetitions of the first message related to RA are transmitted using the same frequency and time allocation values as used to transmit the first message related to RA.

13. The WD of claim 10, further comprising processing circuitry configured to cause the transceiver to transmit one or more repetitions of the first message related to RA across non-contiguous uplink slots.

14. The WD of claim 10, further comprising processing circuitry configured to cause the transceiver to cease transmission of repetitions of the first message related to RA upon receipt from the network node of an early-stop signal.

15. A method implemented by a wireless device, WD, configured to communicate with a network node, the method comprising:
- receiving an indication of a number of zero or more repetitions of a message related to random access, RA, to be transmitted by the WD in response to a random access response, RAR, message transmitted to the WD;
- transmitting a first message related to RA and zero or more repetitions of the first message related to RA in response to receiving the RAR message; and
- transmitting a frequency hop, FH, field to indicate whether the message related to RA is transmitted using one of inter-slot frequency hopping and intra-slot frequency hopping, the FH field being interpreted based at least in part on an aggregation factor that indicates the number of zero or more repetitions of the message related to RA, the FH field interpretation is implemented so that:
- in response to the aggregation factor=1, (no repetition) FH=1 means intra-slot;
- in response to the aggregation factor >1, FH=1 means inter-slot; and
- FH=0 means no frequency hopping irrespective of the aggregation factor.

16. The method of claim 15, wherein the indication of the number of zero or more repetitions is determined at least in part from a physical random access channel preamble.

* * * * *